(12) United States Patent
Wang et al.

(10) Patent No.: US 11,526,694 B2
(45) Date of Patent: *Dec. 13, 2022

(54) MODEL TRAINING USING FULLY AND PARTIALLY-ANNOTATED IMAGES

(71) Applicants: INTERNATIONAL BUSINESS MACHINES CORPORATION, Armonk, NY (US); THE UNIVERSITY OF SOUTHERN CALIFORNIA, Los Angeles, CA (US)

(72) Inventors: Hongzhi Wang, San Jose, CA (US); Tanveer Fathima Syeda-Mahmood, Cupertino, CA (US); John Paul Francis, Los Angeles, CA (US)

(73) Assignees: INTERNATIONAL BUSINESS MACHINES CORPORATION, Armonk, NY (US); UNIVERSITY OF SOUTHERN CALIFORNIA, Los Angeles, CA (US)

( * ) Notice: Subject to any disclaimer, the term of this patent is extended or adjusted under 35 U.S.C. 154(b) by 248 days.

This patent is subject to a terminal disclaimer.

(21) Appl. No.: 16/836,106

(22) Filed: Mar. 31, 2020

(65) Prior Publication Data
US 2021/0303930 A1      Sep. 30, 2021

(51) Int. Cl.
  *G06K 9/00*      (2022.01)
  *G06K 9/62*      (2022.01)
  (Continued)

(52) U.S. Cl.
  CPC ......... *G06K 9/6259* (2013.01); *G06K 9/6232* (2013.01); *G06N 3/0472* (2013.01); *G06N 3/08* (2013.01); *G06V 2201/031* (2022.01)

(58) Field of Classification Search
  CPC .. G06K 9/6259; G06K 9/6232; G06K 9/6256; G06N 3/0472; G06N 3/08; G06V 2201/031
  See application file for complete search history.

(56) References Cited

U.S. PATENT DOCUMENTS 8,135,202 B2    3/2012    Cosatto et al.
9,196,046 B2    11/2015   Meyer
(Continued)

FOREIGN PATENT DOCUMENTS

WO    2018/189550         10/2018
WO    WO-2020031243 A1 *   2/2020   ........... G06K 9/6256

OTHER PUBLICATIONS

United States Patent Office Action for U.S. Appl. No. 16/836,115 dated Sep. 16, 2021 (11 pages).
(Continued)

*Primary Examiner* — Dhaval V Patel
(74) *Attorney, Agent, or Firm* — Michael Best & Friedrich LLP

(57) ABSTRACT

Methods and systems for training a model labeling two or more organic structures within an image. One method includes receiving a set of training images. The set of training images including a first plurality of images and a second plurality of images. Each of the first plurality of images including a label for each of the two or more organic structures and each of the second plurality of images including a label for only a subset of the two or more organic structures. The method further includes training the model using the first plurality of images, the second plurality of images, and a label merging function mapping a label from the first plurality of images to a label included in the second plurality of images.

20 Claims, 5 Drawing Sheets
(3 of 5 Drawing Sheet(s) Filed in Color)

(51) Int. Cl.
*G06N 3/04* (2006.01)
*G06N 3/08* (2006.01)

(56) References Cited

U.S. PATENT DOCUMENTS

| | | | |
|---|---|---|---|
| 10,275,690 | B2 | 4/2019 | Chen et al. |
| 10,430,949 | B1 | 10/2019 | Wang et al. |
| 11,030,747 | B1* | 6/2021 | Feng .................. G06N 3/08 |
| 2019/0030371 | A1* | 1/2019 | Han ..................... G06V 30/194 |
| 2019/0156204 | A1 | 5/2019 | Bresch et al. |
| 2019/0220701 | A1 | 7/2019 | Novak et al. |
| 2019/0347524 | A1 | 11/2019 | Zanmenskiy et al. |
| 2019/0355128 | A1 | 11/2019 | Grauman et al. |
| 2020/0380312 | A1* | 12/2020 | Khan .................. G06K 9/6256 |
| 2021/0256420 | A1* | 8/2021 | Elisha ................. G06N 5/04 |
| 2021/0272288 | A1* | 9/2021 | Takahashi ............. G06T 7/0012 |

OTHER PUBLICATIONS

Anfinsen, "Principles that govern the folding of protein chains," Science, 1973, 181:223-230.

Çiçek et al., "3D U-Net: Learning Dense Volumetric Segmentation from Sparse Annotation," in MICCAI, Springer, 2016, pp. 424-432.

Cour et al., "Learning from Partial Labels," Journal of Machine Learning Research, 2011, 12:1501-1536.

Dehghany et al., "A spatial model of insulin-granule dynamics in pancreatic beta-cells," Traffic, 2015, 16:797-813.

Dice, "Measure of the amount of ecological association between species," Ecology, 1945, 26:297-302.

Ekman et al., "Mesoscale imaging with cryo-light and x-rays: Larger than molecular machines, smaller than a cell," Biol Cell, 2017, 109:24-38.

Guerrero-Peña et al., "Weakly Supervised Method for Instance Segmentation of Biological Cells," arXiv:1908.09891, Aug. 26, 2019 (8 pages).

Kwon et al., "Uncertainty quantification using Bayesian neural networks in classification: Application to biomedical image segmentation," Computational Statistics & Data Analysis, Feb. 2020, 142:106816.

Lin et al., "Focal loss for dense object detection," in ICCV, 2017, pp. 2980-2988.

Litjens et al., "A survey on deep learning in medical image analysis," Medical Image Analysis, 2017, 42:60-88.

Lomanov et al., "Cell Detection With Deep Convolutional Networks Trained With Minimal Annotations," IEEE 16th International Symposium on Biomedical Imaging, Venice, Italy, Apr. 8-11, 2019, 5 pages.

Long et al., "Fully Convolutional Networks for Semantic Segmentation," The IEEE Conference on Computer Vision and Pattern Recognition (CVPR), 2015, pp. 3431-3440.

Ronneberger et al., "U-net: Convolutional networks for biomedical image segmentation," in MICCAI, Springer, 2015, pp. 234-241.

Rorsman et al., "Insulin granule dynamics in pancreatic beta cells," Diadetologia, 2003, 46:1029-1045.

Verbeek et al., "Scene Segmentation with Conditional Random Fields Learned from Partially Labeled Images," In: Proc. NIPS. Citeseer; 2007, 8 pages.

U.S. Appl. No. 16/836,115, filed Mar. 31, 2020.

United States Patent Office Action for U.S. Appl. No. 16/836,115 dated Feb. 14, 2022 (12 pages).

United States Patent Office Notice of Allowance for U.S. Appl. No. 16/836,115 dated May 18, 2022 (8 pages).

United States Patent Office Corrected Notice of Allowance for U.S. Appl. No. 16/836,115 dated Jun. 17, 2022 (2 pages).

* cited by examiner

| | | DSC | | | | |
|---|---|---|---|---|---|---|
| | | Membrane | Nucleus | Insulin | Mitochondria | Average |
| Validation Set | Baseline | 0.848 | 0.928 | 0.515 | 0.458 | 0.687 |
| | Mixed Labels | 0.889 | 0.917 | 0.565 | 0.584 | 0.739 |
| Testing Set | Baseline | 0.813 | 0.718 | 0.559 | 0.467 | 0.639 |
| | Mixed Labels | 0.843 | 0.817 | 0.588 | 0.575 | 0.706 |
| | *Difference in percentage* | *+3.6%* | *+13.8%* | *+5.2%* | *+23.1%* | *+10.5%* |

FIG. 4

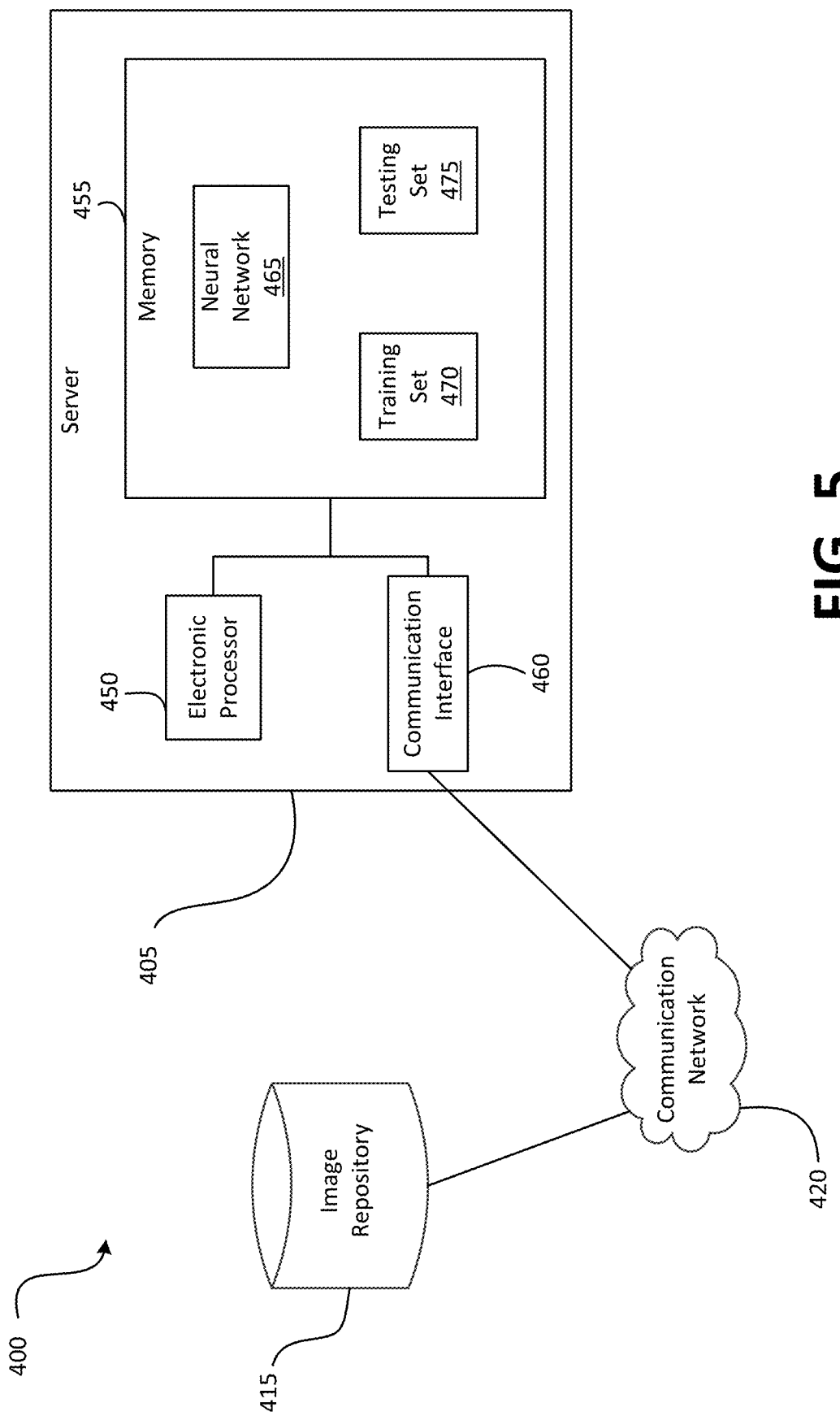

MODEL TRAINING USING FULLY AND PARTIALLY-ANNOTATED IMAGES

FIELD

Embodiments described herein relate to systems and methods for training a model, such as a neural network, using partially-annotated images. For example, some embodiments receive training images, such as medical images, that include both fully-annotated images as well as partially-annotated images. A label merging function is used to map labels from the fully-annotated images to the partially-annotated images and the merged images are used to train a model.

SUMMARY

Understanding the structure and function of cells is increasingly important as many of the most pressing modern diseases, such as, for example, cancer, Alzheimer's, and diabetes, are rooted in malfunction at the cellular scale.

For example, the pancreatic beta cell is responsible for secreting insulin and is therefore an important target in diabetes treatment. To better understand the process of insulin secretion, models are needed to classify the three-dimensional spatial organization of insulin vesicles along the course of the disease. Similarly, models are needed to classify the relative organization of cellular structures, such as, for example, the mitochondria, membrane, and nucleus. These features together constitute a subset of the cell's ultrastructure. Observing ultrastructural rearrangements and cell-to-cell variability induced by incretins and other molecules used to treat diabetes may provide mechanistic insights into therapeutic and off-target actions as more effective treatments are being developed.

To model the ultrastructure of a beta cell, soft X-ray tomography techniques have been applied to acquire three-dimensional (3D) cellular imaging data. In FIG. 1, for example, an original tomogram 100 is a 512×512×512, 8-bit grayscale image, acquired at a resolution of approximately 25 $nm^3$/voxel, which is sufficient to reveal ultrastructural components in vitro. To analyze pathological variance in ultrastructure, these individual components must be identified and segmented quantitatively. For example, during segmentation, this image can be labeled with a 512×512×512 mask containing discrete values [0, 1, 2, 3, and 4] to create a labeled tomogram 105, where "0" corresponds to background, "1" corresponds to a membrane, "2" corresponds to a nucleus, "3" corresponds to an insulin vesicle, and "4" corresponds to mitochondria. The background of an image may be any pixel that does not correspond to an ultrastructural component. In some embodiments, values "3" and "4" only exist in labels of INS-1E cells. With these masks, a 3D surface model 110 of the cell can be constructed for visualization and analysis.

This labeling process, however, is not trivial and requires significant manual overhead. For example, manually segmenting just one tomogram for a membrane, a nucleus, mitochondria, and insulin vesicles, may, for example, take an expert up to 8 hours and may require specialized software. Due to its high cost, manual annotation is prohibitive for large scale studies. Accordingly, automating this segmentation process is of high interest.

Furthermore, models, such as neural networks, typically require fully-annotated images for training purposes and, in general, the more available images, the better the training. For example, Convolutional neural networks (CNN) have been successfully applied for segmentation in various biomedical imaging domains. However, accurate segmentation performance achieved by CNNs often relies on the availability of a large amount of fully-annotated training data.

Accordingly, embodiments described herein provide methods and systems for training a model, such as a neural network, using partially-annotated images. For example, partially-annotated images can be used as training data along with fully-annotated images, wherein the fully-annotated images can be "merged" with the partially-annotated images using a label merging function that maps labels from the fully-annotated images to the partially-annotated images. Similarly, in some embodiments, one set of partially-annotated images can be merged with another set of partially-annotated images using their respective label merging functions, wherein labels from fully-annotated images can be mapped to each partially-annotated image using their respective label merging function.

Embodiments are described herein using tomograms of whole beta cells as an example, wherein the tomograms were collected from three different cell lines: the 1.1B4 human beta cell line, the human embryonic kidney (HEK) cell line and the INS-1E cell line. For 1.1B4 cells and HEK cells, only the membrane and nucleus were labeled and insulin vesicles and mitochondria were labeled as part of the membrane (and, thus, these images represented partially-annotated labels). For INS-1E cells, more detailed annotations of insulin vesicles and mitochondria inside the membrane were produced in addition to the membrane and nucleus (and, thus, these images represented fully-annotated images). Since the "membrane" label has different semantic meaning in the partially-annotated images versus the fully-annotated images, mixing the partially-annotated images with the fully-annotated images in a classical learning scheme would undermine the performance for those labels with inconsistent meanings. However, rather than discard partially-annotated images, the methods and systems described herein effectively use the partially-annotated images for training.

In particular, the methods and systems described are based on the observation that each label in a partially-annotated image can be derived from fully-annotated data by merging labels. For example, partially-labeled data for 1.1B4 and HEK cells can be derived from fully-labeled data by merging insulin vesicle and mitochondria labels with the membrane label. Following this derivation, any fully-annotated data can be compared with partially-annotated data during model training.

It should be understood that the types of images and specific labels described herein are provided as example implementations of the disclosed methods and systems. There are many situations in which partial annotations are produced over projects with different objectives, and the methods and systems described herein can be applied for any type of partially-annotated data so long as such a merging function is possible with other data, such as fully-annotated data. For instance, a study focusing on lung diseases may produce labels for only lung structures using chest CT volumes, while a study on cardiac vascular diseases may produce labels for only cardiac structures using a different set of chest CT volumes. In this example, both the lung-only annotation and the cardiac-only annotation are partially-annotated data that could be derived from fully-annotated data containing both lung and cardiac structures by merging the other label with the background. After such merging, fully-annotated data is available for training against partial ground truth. Furthermore, since each labeled anatomical (organic) structure may provide contextual information for other anatomical structures, learning with partially-annotated data not only informs a unified segmentation model for each anatomical structure alone but also improves the overall segmentation performance for every structure together.

Note that learning with incomplete annotation is different from learning with sparse annotation, where only part of the training data is fully-annotated and the rest is completely unlabeled, and learning with ambiguous annotation, where a set of candidate labels are given for each instance but only one label is correct. Learning with incomplete annotations addresses unique situations in which annotations contain only a subset of labels of interest that subsume missing, more detailed labels of greater semantic depth.

Accordingly, embodiments described herein train models, such as convolutional neural networks, using partially-annotated images alone or in combination with fully-annotated medical images. For example, one embodiment provides a computer-implemented method of training a model labeling two or more organic structures within an image. The method includes receiving a set of training images. The set of training images including a first plurality of images and a second plurality of images. Each of the first plurality of images including a label for each of the two or more organic structures and each of the second plurality of images including a label for only a subset of the two or more organic structures. The method also includes training the model using the first plurality of images, the second plurality of images, and a label merging function mapping a label from the first plurality of images to a label included in the second plurality of images.

Another embodiment provides a system for training a model labeling two or more organic structures within an image. The system includes an electronic processor. The electronic processor is configured to receive a set of training images. The set of training images including a first plurality of images and a second plurality of images. Each of the first plurality of images including a label for each of the two or more organic structures and each of the second plurality of images including a label for only a subset of the two or more organic structures. The electronic processor is also configured to train the model using the first plurality of images, the second plurality of images, and a label merging function mapping a label from the first plurality of images to a label included in the second plurality of images.

A further embodiment provides non-transitory computer-readable medium storing instructions that, when executed by an electronic processor, perform a set of functions. The set of functions includes receiving a set of training images for training a model labeling two or more organic structures within an image. The set of training images including a first plurality of images and a second plurality of images. Each of the first plurality of images including a label for each of the two or more organic structures and each of the second plurality of images including a label for only a subset of the two or more organic structures. The set of functions also including training the model using the first plurality of images, the second plurality of images, and a label merging function mapping a label from the first plurality of images to a label included in the second plurality of images.

An additional embodiment provides a method of training a model labeling two or more organic structures within an image. The method includes receiving a set of training images. The set of training images including a first plurality of images and a second plurality of images. Each of the first plurality of images including a label for a first subset of the two or more organic structures and each of the second plurality of images including a label for a second subset of the two or more organic structures, the second subset being different than the first subset. The method also includes training the model using the first plurality of images, the second plurality of images, and a label merging function mapping a label from the first plurality of images to a label included in the second plurality of images.

Another embodiment provides a system for training a model labeling two or more organic structures within an image. The system includes an electronic processor. The electronic processor is configured to receive a set of training images. The set of training images including a first plurality of images and a second plurality of images. Each of the first plurality of images including a label for a first subset of the two or more organic structures and each of the second plurality of images including a label for a second subset of the two or more organic structures, the second subset being different than the first subset. The electronic processor is also configured to train the model using the first plurality of images, the second plurality of images, and a label merging function mapping a label from the first plurality of images to a label included in the second plurality of images.

Yet another embodiment provides non-transitory computer-readable medium storing instructions that, when executed by an electronic processor, perform a set of functions. The set of functions including receiving a set of training images for training a model generating a label for each of two or more organic structures in an image. The set of training images including a first plurality of images and a second plurality of images. Each of the first plurality of images including a label for a first subset of the two or more organic structures and each of the second plurality of images including a label for a second subset of the two or more organic structures, the second subset being different than the first subset. The set of functions also includes training the model using the first plurality of images, the second plurality of images, and a label merging function mapping a label from the first plurality of images to a label included in the second plurality of images.

Other aspects of the embodiments will become apparent by consideration of the detailed description and accompanying drawings.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 4 illustrates a table showing quantitative dice scores evaluated on validation and testing sets.

FIG. 5 illustrates a block diagram of a system for training a neural network according to one embodiment.

DETAILED DESCRIPTION

Figure 1:
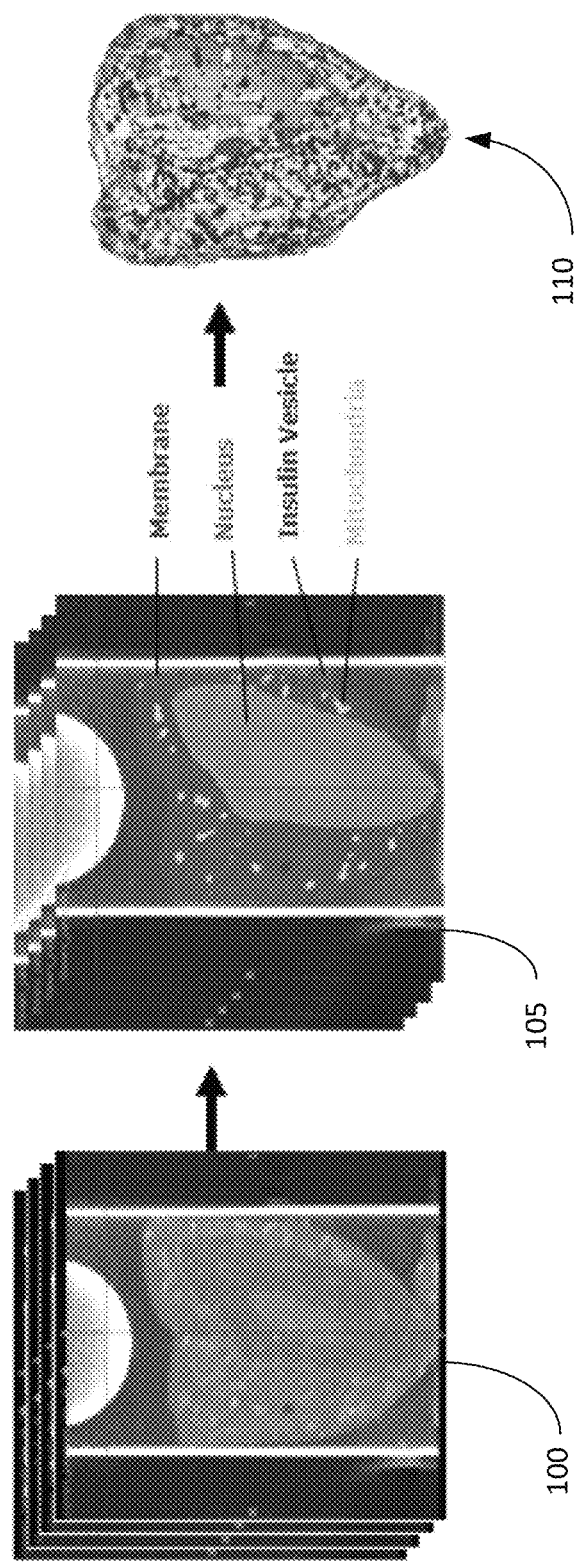
FIG. 1 illustrates an example of reconstructing a 3D surface model of a cell.

Before any embodiments are explained in detail, it is to be understood that the embodiments are not limited in their application to the details of construction and the arrangement of components set forth in the following description or illustrated in the following drawings. Other embodiments are capable of being practiced or of being carried out in various ways.

Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and may include electrical connections or coupling, whether direct or indirect. Also, electronic communications and notifications may be performed using any known means including direct connections, wireless connections, etc.

A plurality of hardware and software based devices, as well as a plurality of different structural components may be utilized to implement the embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognized that, in at least one embodiment, the electronic-based aspects of the embodiments may be implemented in software (e.g., stored on non-transitory computer-readable medium) executable by one or more processors. As such, it should be noted that a plurality of hardware and software based devices, as well as a plurality of different structural components, may be utilized to implement the embodiments. For example, "mobile device," "computing device," and "server" as described in the specification may include one or more electronic processors, one or more memory modules including non-transitory computer-readable medium, one or more input/output interfaces, and various connections (e.g., a system bus) connecting the components.

As described above, embodiments described herein provide systems and methods for training a model using both partially-annotated medical images and fully-annotated medical images. Using both partially-annotated images and fully-annotated images increases the size of the training set, which improves the training process and, consequently, the resulting model. One example implementation of the methods and systems is provided below. However, as noted above, this example should not be considered limiting. For example, the methods and systems described herein can be applied to other types of images and other labeled organic structures. Also, the methods and systems described herein can be applied to any number of labels to train a model configured to identify any number of (i.e., two or more) organic structures within an image. Within the present application, the terms "fully-annotated" and "fully-labeled" are used interchangeably to describe a set of images including a full or complete set of labels. Similarly, the terms "partially-annotated," "incompletely-annotated," "partially-labeled," and "incompletely-labeled" are used interchangeably within the present application to describe a set of images including a partial or incomplete set of labels (i.e., a subset of the full or complete set of labels).

In the described example, soft x-ray tomography was performed on 216 INS-1E cells, and 27 of those resulting tomograms were manually segmented for membrane, nucleus, mitochondria, and insulin vesicles, as shown in FIG. 1. In addition, soft x-ray tomography was performed on HEK and 1.1B4 cells, 12 of which were segmented by experts as part of a negative control group. For HEK and 1.1B4 cells, insulin vesicles and mitochondria were labeled as part of membrane. It should be understood that while this inconsistency in the manually-segmented data was an artifact of the particular example, diverse data sets from similar imaging conditions are common and the ability to leverage heterogeneous data in neural network training presents many opportunities, especially when labeled data is scarce.

The original image and manual segmentation for each labeled tomogram were resized to 512×512×512 voxels using linear and nearest-neighbor interpolation, respectively. It should be understood that the labeled tomograms may be resized to any dimension of voxels that is most convenient for a particular project and the resized dimensions described here are provided as one example. From the 27 fully-labeled INS-1E data, 12 were randomly selected for training, 5 were selected for validation, and 10 were selected for testing. All 12 partially-labeled 1.1B4/HEK cells were included for model training as well.

Accordingly, in this example, the 12 fully-labeled images selected for training represent a set of fully-labeled images including a first plurality of images (12 in this example) and the 12 partially-labeled images represent a set of partially-labeled images including a second plurality of images (12 in this example). The fully-labeled images include a label for each organic structure within a set of two or more organic structures (i.e., membrane, nucleus, mitochondria, and insulin vesicles), wherein the partially-labeled images include a label for only a subset of these organic structures (i.e., membrane and nucleus). As noted above, any number of organic structures may be labeled within a fully-annotated image and the model being trained can be configured to similarly label any number of organic structures.

To learn with the partially-labeled images, a label merging function is used. For example, let L be a complete label set. Without loss of generality, assume that each voxel in an image is assigned with a single label. Let $I^F=\{(I_i,S_i)\}_{i=1}^{n}$ be n fully-labeled training images, where $I_i$ and $S_i$ are image and ground truth segmentation, respectfully. Let $I^P=\{(I_j,S_j^P)\}_{j=1}^{m}$ be m partially-labeled training images, with label set $L^P$ and $|L^P|<|L|$. Let $T^P:L\rightarrow L^P$ be a mapping (label merging) function that maps each label from the full label set L to one label in $L^P$.

Figure 2:
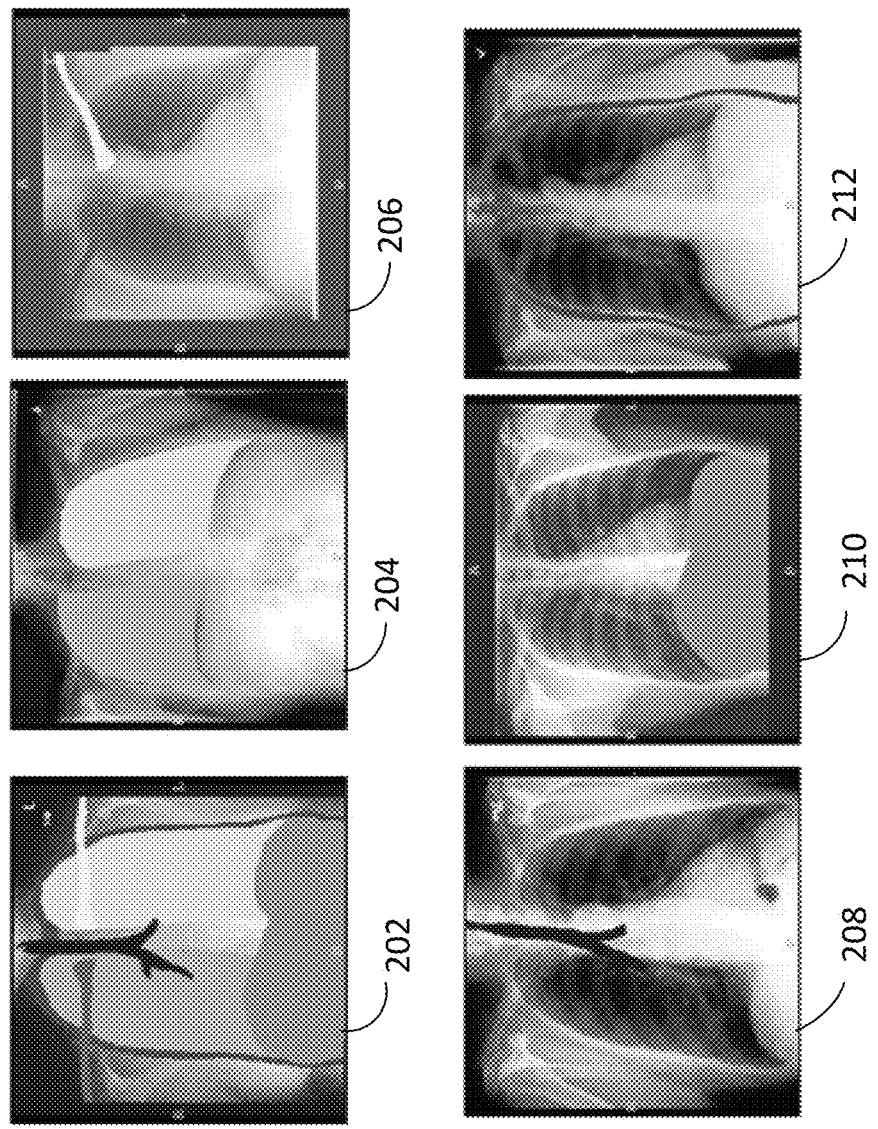
FIG. 2 illustrates an example of a fully-annotated medical image and examples of partially-annotated medical images.

As an example of label merging, FIG. 2 illustrates a set of training images including a first medical image 202, a second medical image 204, a third medical image 206, a fourth medical image 208, a fifth medical image 210, and a sixth medical image 212. The first medical image 202 has labels for the lungs, clavicle, trachea, sub-diaphragmatic area, and rib cage. The second medical image 204 has a label for the lungs. The third medical image 206 has a label for the clavicle. The fourth medical image 208 has a label for the trachea. The fifth medical image 210 has a label for the sub-diaphragmatic area. The sixth medical image 212 has a label for the rib cage. In this example, the first medical image 202 represents a fully-annotated image and the second, third, fourth, fifth, and sixth medical images 204, 206, 208, 210, and 212 represent partially-annotated images.

As discussed above, each medical image has a respective label-merging function, which takes in account the number of labels included in the partially-labeled image and relationships between labels. For example, in the example set of training images illustrated in FIG. 2, the first medical image 202, representing the fully-labeled image, sets the full set of available labels. Accordingly, each label merging function will add labels to the partially-labeled images so that all of the images included in the training set include a full set of labels. In particular, as one example, the second medical image 204 may be associated with a label merging function of T(lung)=lung (as labeled in the second medical image 204), T(clavicle)=background, T(trachea)=background, T(sub-diaphragmatic area)=background, and T(rib cage)=background. In this example, each label included in the first medical image 202 that is not included in the second medical image 202 is set, for the second medical image 204, to the background of the second medical image 204 (the portion of second medical image 204 not labeled as a particular organic structure) since the corresponding organic structure isn't labeled in the second medical image 204. In should be understood that other types of label merging functions can be used, such as, for example, based on relationships between labels. For example, in the example dataset described above, the label merging function can include $T^P$ (mitochondria)=membrane and $T^P$ (insulin vesicle)=membrane since the "membrane" label represents a union of multiple labels or components. In other situations, a label merging function may set a label to multiple labeled organic structures (i.e., the combination of multiple labels). Similarly, a label merging function may define a particular label as including a subset of a labeled portion of an image. For example, if a particular unlabeled organic structure is generally positioned in a particular orientation from a labeled structure, the label mapping function may apply this known correlation or relationship. As one example using the example training images in FIG. 2, the sub diaphragmatic area is generally positioned below the lungs. Accordingly, when a partially-labeled image has a label for the lungs, this label can be used by the label merging function to define a label for the sub diaphragmatic area, such as by setting the label for the sub diaphragmatic area to the background of the partially-labeled image below the lungs. After applying the one or more appropriate label merging functions, each training image in the set of training images has a full set of labels (as defined by the fully-labeled dataset).

Returning to the specific example dataset L described above, let $\theta$ be the parameters of a model, such as a convolutional neural network. Let $M_\theta(I)$ be the result produced by the model for image I. With this configuration, the following objective function combines the fully-labeled data and the partially-labeled data in training:

$$L(\theta) = \sum_{i=1}^{n} L^F(M_\theta(I_i), S_i) + \sum_{j=1}^{m} L^P(M_\theta(I_j), S_j^P)$$

$L^F$ is the standard term on fully-labeled training data. $L^P$ is applied on the partially-labeled data. For training data with full annotation, we apply a loss function (for example, a cross entropy function):

$$L^F(M_\theta(I), S) = \sum_{l \in L} \sum_{x \in r(S,l)} -\log(p_l(x|I, \theta))$$

x index through image voxels. $p_l$ is the model predicted probability for label l from the full label set L. r(S,l) is the region assigned to l in ground truth S.

For partially-labeled training data, a modified loss function is applied by transforming model predications for label set L by:

$$L^P(M_\theta(I), S^P) = \sum_{l \in L^P} \sum_{x \in r(S,l)} -\log(p_l^P(x|I, \theta))$$

where $p^P$ is the model predicted probability for label set $L^P$. The model predicted probability $p^P$ may be, for example, a probability that a pixel is a portion of is assigned a specific label in the label set $L^P$. The model predicted probability $p^P$ is derived from the model predicted probability for L by:

$$p_l^P(x|I, \theta) = \sum_{T^P(l')=l} p_{l'}(x|I, \theta)$$

In the provided example, only one partially-labeled dataset was used. In other embodiments, multiple partially-labeled datasets may be available (e.g., from different data sources or research projects). For those scenarios, each partially-labeled dataset can be represented by a distinct label mapping function $T^P$. The formulation above can be applied to include each partially-labeled dataset for training by adding its corresponding $L^P$ term to the objective function.

Also, in some embodiments, multiple sets of partially-labeled datasets may be used. For example, the training images used in a particular implementation may include a first plurality of images, a second plurality of images, and a third plurality of images. The first plurality of images may be a fully-labeled dataset including labels for heart and lung. The second plurality of images may be a first partially-labeled dataset including lung labels. The third plurality of images may be a second partially-labeled dataset including labels for heart and stomach. In this embodiment, the first partially-labeled dataset is associated with a first label merging function, and the second partially-labeled dataset is associated with a second label merging function. The formulation above can be applied to include additional label mapping functions by adding corresponding $T^P$ terms to the predicted probability.

Furthermore, in some embodiments, a second set of partially-labeled images can be used in place of a set of fully-labeled images. For example, two or more partially-labeled images can be merged, as described above, to increase the amount of training data available for training. In particular, assume a model is needed to segment the heart, stomach, and lungs. If a first set of partially-labeled images are available that label the heart and stomach and a second set of partially-labeled images are available that label the heart and lungs, these sets of images can be merged as described above and used to train the model. In this situation, each partially-labeled dataset can be associated with a label merging function that maps a label from the partially labeled dataset to a label in the another partially labeled dataset. In this situation, the combination of all labels amongst all of the partially-labeled datasets can define the full label set.

Following training, the model is capable of labeling unannotated images. For example, if a medical image is received, the model generates a label for each organic structure within the medical image based on the fully-labeled images provided for training. In some embodiments, training images may include a background label. However, in embodiments where a background label is not one of the labels within the training data, each pixel not associated with an organic structure within the medical image may be assigned a background label.

It should be understood that prior to being used to label unannotated images, the trained model may go through one or more validation or testing processes. For example, after training, the model may be used to generate predicted labels for one of the validation or testing images (e.g., one of the fully-labeled images selected for validation or testing). The predicted label (which may be converted to a format consistent with the testing image, such as using the label merging function) can then be compared to the actual label in the testing image. For instance, if a model produces segmentation for heart, lung and background, while a testing image only has lung labeled, then a label merging function that merges the heart label to the background label should be applied to convert the model predicted results to be comparable to the testing data.

For the specific example disclosed herein, both the fully-labeled images and the partially-labeled images were applied for CNN training. For comparison, a baseline method was also trained only using the fully-labeled training data. In both cases, data augmentation was implemented by applying a randomly generated affine transform, with (−180°, 180°] rotation and [−20%, 20%] scale variation, to the training data on-the-fly. Both methods were run for 200 epochs. For quantitative evaluation, the dice similarity coefficient (DSC) was applied to measure agreement between automatic and manual segmentation.

Figure 3:
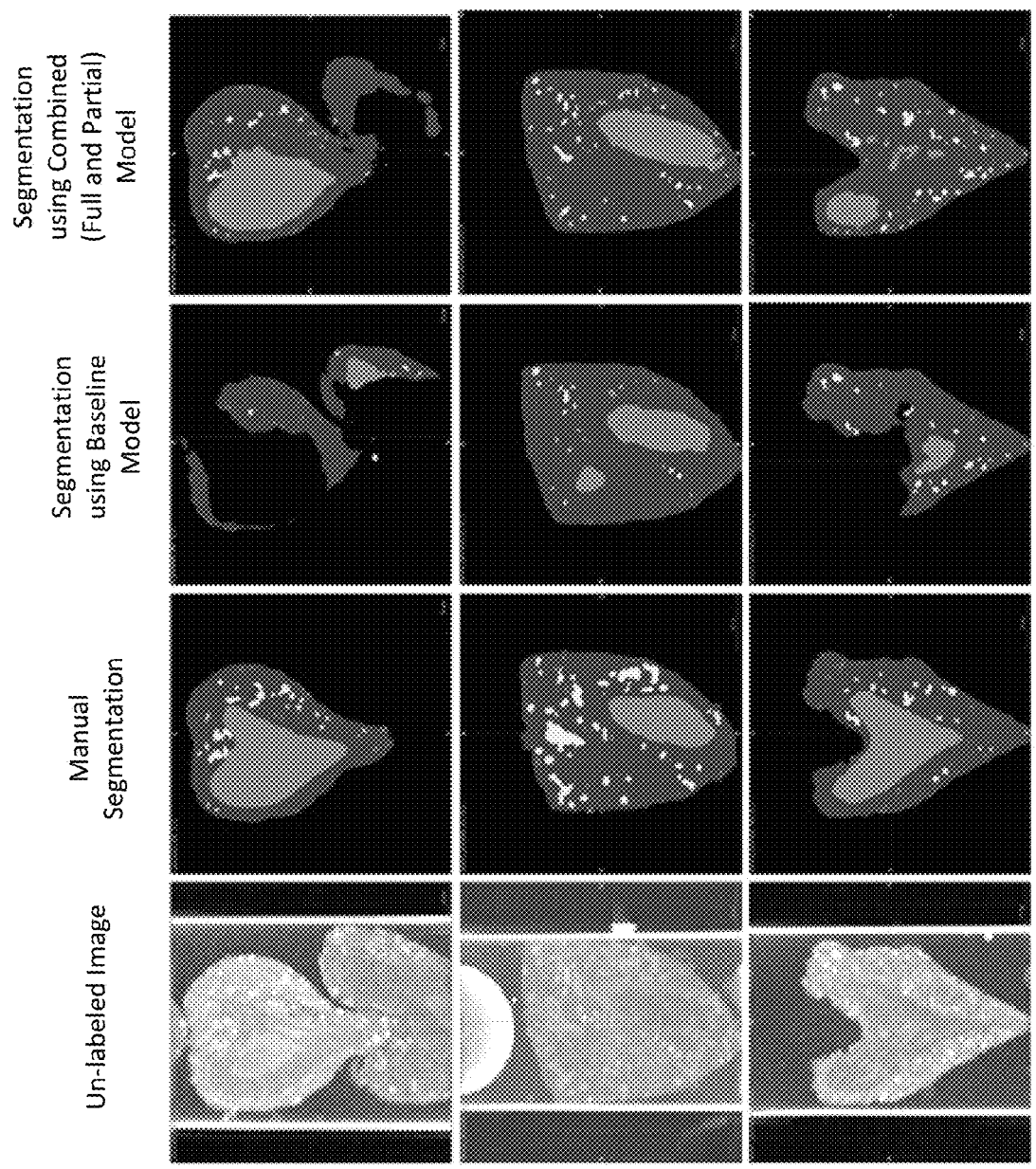
FIG. 3 illustrates example segmentation results on a testing set.

FIG. 3 shows example segmentation results produced for testing data for each segmentation method. As illustrated, including partially-annotated data for training demonstrates better alignment with the ground truth, more thorough labeling on inner structures, and more robustness to varying backgrounds in the label as compared to the baseline method trained using only fully-annotated training data.

FIG. 4 also summarizes the segmentation performance on validation and testing data, respectively. For the table of FIG. 4, quantitative dice scores were evaluated on the validation and testing sets. The mixed label method (including both fully-labeled and partially-labeled data) outperformed the baseline method at every level in every category except for the nucleus label in the validation. In that specific case, both methods performed very well and the relative decline of 1% was likely an artifact of the smaller sized validation set.

As illustrated in FIG. 4, including partially-labeled training data for training substantially improved segmentation performance for membrane and nucleus, which are labeled in both the fully-labeled data and the partially-labeled data. As also illustrated in FIG. 4, prominent improvement was also observed for insulin vesicles and mitochondria, which are not labeled in the partially-labeled training set. This improvement recognizes that including partially-labeled data for training doubles the available training data, which is important for learning a more robust over-all representation for better segmentation. The improvement for these labels also recognizes that a more robust knowledge of the distribution on one set of structures in the cell can inform the inference of others. Specifically, both insulin vesicle and mitochondria are located within membrane and if a segmentation method misclassifies membrane regions as other structures, it is likely to misclassify insulin vesicle and mitochondria as well.

Overall, the segmentation performance of the combined method was improved from 0.639 DSC to 0.706 DSC, a 10.5% improvement over the baseline performance, demonstrating one advantage of combining data with incomplete annotations in CNN training.

It should be understood that the functionality described herein can be performed via one or more computing devices, such as one or more servers. For example, FIG. 5 illustrates a system 400 for training a neural network from both fully-labeled and partially-labeled images according to some embodiments. As illustrated in FIG. 5, the system 400 includes a server 405 and an image repository 415. The server 405 and the image repository 415 communicate over one or more wired or wireless communication networks 420. Portions of the wireless communication networks 420 may be implemented using a wise area network, such as the Internet, a local area network, such as a Bluetooth™ network or Wi-Fi, and combinations or derivatives thereof. It should be understood that the system 400 may include more or fewer servers and the single server 405 illustrated in FIG. 5 is purely for illustrative purposes. For example, in some embodiments, the functionality described herein is performed via a plurality of servers in a distributed or cloud-computing environment. Also, in some embodiments, the server 405 may communicate with multiple image repositories or multiple reports repositories. Furthermore, in some embodiments, an image repository may be combined with a report repository and, in some embodiments, one or more of these repositories may be combined with the server 405. Also, in some embodiments, the components illustrated in system 400 may communicate through one or more intermediary devices (not shown).

In some embodiments, three dimensional images volumes are stored in the image repository 415. The image repository 415 may be, for example, a picture archiving and communication system (PACS), a cloud storage environment, or the like. The three dimensional image volumes stored in the image repository 415 are generated by an imaging modality (not shown), such as an X-ray computed tomography (CT) scanner, a magnetic resonance imaging (Mill) scanner, or the like. In some embodiments, the image repository 415 may also be included as part of an imaging modality. As noted above, images in the image repository 415 may be partially-labeled or fully-labeled.

As illustrated in FIG. 5, the server 405 includes an electronic processor 450, a memory 455, and a communication interface 460. The electronic processor 450, the memory 455, and the communication interface 460 communicate wirelessly, over wired communication channels or buses, or a combination thereof. The server 405 may include additional components than those illustrated in FIG. 5 in various configurations. For example, in some embodiments, the server 405 includes multiple electronic processors, multiple memory modules, multiple communication interfaces, or a combination thereof. Also, it should be understood that the functionality described herein as being performed by the server 405 may be performed in a distributed nature by a plurality of computers located in various geographic locations. For example, the functionality described herein as being performed by the server 405 may be performed by a plurality of computers included in a cloud computing environment.

The electronic processor 450 may be, for example, a microprocessor, an application-specific integrated circuit (ASIC), and the like. The electronic processor 450 is generally configured to execute software instructions to perform a set of functions, including the functions described herein.

The memory 455 includes a non-transitory computer-readable medium and stores data, including instructions executable by the electronic processor 450. The communication interface 460 may be, for example, a wired or wireless transceiver or port, for communicating over the communication network 520 and, optionally, one or more additional communication networks or connections.

As illustrated in FIG. 5, the memory 455 of the server 405 includes a neural network 465, a training set 470, and a testing set 475. The neural network 465 may be, for example, a 2D U-net architecture, a 3D convolutional neural network (CNN), or the like. For example, the example provided above can be performed using a standard 2D U-net architecture since both mitochondria and insulin vesicles are small scale structures. In particular, in some embodiments, a 2D network can be used that consists of a contracting path and an expanding path. The contracting path can be 5 levels deep with a 2×2 pooling between each level, while the expanding path can be connected by an unsampling filter with a 2×2 kernel. Convolutions can have a kernel size of 3×3, stride=1, and pad=1 followed by rectified linear units (ReLu). Each level can be composed of 2 convolutions back to back. The number of filters at the top level can be 32 and doubled at each level of depth in the network. The last layer can contain 1×1 convolution followed by a softmax, which provides pixel-wise probabilities of each segmentation level.

The neural network 465 is trained via the training set 470. As described above, the training set 470 includes partially-labeled images and fully-labeled images, which may be retrieved or accessed from the image repository 415. After the neural network 465 is trained by the training set 470, the testing set 475 may be used to confirm an accurate training of the neural network. After the neural network 465 is trained and tested, the neural network 465 can be used to label unannotated medical images.

As noted above, it should also be understood that the methods and systems described herein are not limited to HEK cells, 1.1B4 cells, or chest CT volumes, but can be used with various types of volumetric image data when partially-labeled and fully-labeled training images are available. Furthermore, the implementations described herein can be used with various slice spacing and even with image volumes with an arbitrary number of slices (all scans used do not necessarily need to have the same number of slices). Furthermore, as also noted above, the methods and systems described herein can be used with training data that includes labels for background, in addition to organic structures. However, in other embodiments, the training data may only include annotations for organic structures within the images. Furtherstill, in some embodiments, the methods and systems described herein can be used for images other than medical images. Furthermore, the methods and systems described herein can be used to train a segmentation model configured to process any type of image when both fully-annotated and partially-annotated training data is available and can be merged as described herein.

Various features and advantages of the embodiments are set forth in the following claims.

What is claimed is:

1. A computer-implemented method of training a model labeling two or more organic structures within an image, the method comprising:
receiving a set of training images, the set of training images including a first plurality of images and a second plurality of images, each of the first plurality of images including a label for each of the two or more organic structures and each of the second plurality of images including a label for only a subset of the two or more organic structures; and
training the model using the first plurality of images, the second plurality of images, and a label merging function mapping a label from the first plurality of images to a label included in the second plurality of images, wherein the label merging function maps the label from the first plurality of images to the label included in the second plurality of images by adding a label to at least one image included in the second plurality of images for an organic structure included in the two or more organic structures and not included in the subset of the two or more organic structures.

2. The method of claim 1, further comprising:
receiving a medical image; and
generating, with the model as trained, a label for each of the two or more organic structures within the medical image.

3. The method of claim 2, wherein generating the label for each of the two or more organic structures within the medical image includes determining, for each pixel of the medical image, a probability that the pixel is a portion of one of the two or more organic structures.

4. The method of claim 1, wherein at least one of the plurality of first images includes a label for background, the background not including the two or more organic structures.

5. The method of claim 4, wherein the model is further configured to label background within the image.

6. The method of claim 1, wherein the two or more organic structures include a heart and a lung.

7. The method of claim 1, wherein the two or more organic structures include at least two selected from a group consisting of a cellular membrane, a nucleus, an insulin vesicle, and a mitochondria.

8. The method of claim 1, wherein the first plurality of images includes a plurality of tomographic medical images.

9. The method of claim 1, wherein the first plurality of images includes a plurality of cellular ultrastructure images.

10. The method of claim 1, wherein the model includes a convolutional neural network.

11. The method of claim 1, wherein the set of training images further includes a third plurality of images, each of the third plurality of images including a label for only a third subset of the two or more organic structures different than the first subset and the second subset, and wherein training the model includes training the model using the first plurality of images, the second plurality of images, the third plurality of images, the label merging function mapping a label from the first plurality of images to a label included in the second plurality of images, and a second label merging function mapping a label from the first plurality of images to a label included in the third plurality of images.

12. A system for training a model labeling two or more organic structures within an image, the system comprising:
an electronic processor configured to:
receive a set of training images, the set of training images including a first plurality of images and a second plurality of images, each of the first plurality of images including a label for each of the two or more organic structures and each of the second plurality of images including a label for only a subset of the two or more organic structures; and
train the model using the first plurality of images, the second plurality of images, and a label merging function mapping a label from the first plurality of images to a label included in the second plurality of images, wherein the label merging function maps the label from the first plurality of images to the label included in the second plurality of images by adding a label to at least one image included in the second plurality of images for an organic structure included in the two or more organic structures and not included in the subset of the two or more organic structures.

13. The system of claim 12, wherein the electronic processor is further configured to:
  receive a medical image; and
  generate, with the model as trained, a label for each of the two or more organic structures within the medical image.

14. The system of claim 13, wherein generating the label for each of the two or more organic structures within the medical image includes determining, for each pixel of the medical image, a probability that the pixel is a portion of one of the two or more organic structures.

15. The system of claim 12, wherein at least one of the first plurality of images includes a label for background, the background not including the two or more organic structures.

16. The system of claim 15, wherein the model is further configured to label background within the image.

17. Non-transitory computer-readable medium storing instructions that, when executed by an electronic processor, perform a set of functions, the set of functions comprising:
  receiving a set of training images for training a model labeling two or more organic structures within an image, the set of training images including a first plurality of images and a second plurality of images, each of the first plurality of images including a label for each of the two or more organic structures and each of the second plurality of images including a label for only a subset of the two or more organic structures; and
  training the model using the first plurality of images, the second plurality of images, and a label merging function mapping a label from the first plurality of images to a label included in the second plurality of images,
  wherein the label merging function maps the label from the first plurality of images to the label included in the second plurality of images by adding a label to at least one image included in the second plurality of images for an organic structure included in the two or more organic structures and not included in the subset of the two or more organic structures.

18. The non-transitory computer-readable medium of claim 17, wherein the set of functions further comprises:
  receiving a medical image; and
  generating, with the model as trained, a label for each of the two or more organic structures within the medical image.

19. The non-transitory computer-readable medium of claim 18, wherein generating the label for each of the two or more organic structures within the medical image includes determining, for each pixel of the medical image, a probability that the pixel is a portion of one of the two or more organic structures.

20. The non-transitory computer-readable medium of claim 17, wherein at least one of the first plurality of images includes a label for background, the background not including the two or more organic structures.

* * * * *